United States Patent Office 3,504,034
Patented Mar. 31, 1970

3,504,034
NITROSOANILINONITROALKANES WITH IMPROVED THERMAL STABILITY
Robert Lee Wright, Nitro, W. Va., assignor to Monsanto Company, St. Louis, Mo., a corporation of Delaware
No Drawing. Filed Nov. 8, 1967, Ser. No. 681,569
Int. Cl. C07c 87/60
U.S. Cl. 260—577                10 Claims

ABSTRACT OF THE DISCLOSURE

The thermal stability of nitrosoanilinonitroalkanes is greatly improved by washing the compounds with an aqueous solution of either an alkali metal hydroxide or an alkaline salt of an alkali metal and drying the base containing products. Nitrosoanilinonitroalkanes are useful to promote the reaction of vulcanizable elastomers and a reinforcing pigment.

BACKGROUND OF THE INVENTION

The invention relates to improved thermal stability for nitrosoanilinonitroalkanes which are promoters for the reaction of elastomers and a reinforcing pigment.

Mullin's and Walker's U.S. Patent 3,151,161, Cl. 260–577, Sept. 29, 1964, is to nitrosoanilinonitroalkanes per se. In the Mullin's examples for preparing nitrosoanilinonitroalkanes, the final wash of the products is a water wash. These water-washed nitrosoanilinonitroalkanes decompose easily, especially at elevated temperatures, and are a hazard in storage or shipment. Nitrosoanilinonitroalkanes stabilized by the method of my invention can be stored and shipped by conventional means since decomposition is no longer a serious problem.

SUMMARY OF THE INVENTION

The invention relates to a method for improving the stability of nitrosoanilinonitroalkanes which includes a final wash of the nitrosoanilinonitroalkanes with an aqueous solution of either an alkali metal hydroxide or an alkaline salt of an alkali metal and to the nitrosoanilinonitroalkane compositions obtained by this method. The pH range of a 0.1 N solution of the alkali metal hydroxides and alkaline salts of alkali metals useful in this invention is from 9 to 14. After the wash, the compositions are dried and are ready for safe storage or shipment. The compositions of this invention which contain nitrosoanilinonitroalkanes admixed with alkali metal compounds are less subject to decomposition which has been a problem with nitrosoanilinonitroalkanes in the past.

DESCRIPTION OF THE PREFERRED EMBODIMENTS

A preferred embodiment of the invention is the stabilization of N-(2-methyl-2-nitropropyl)-4-nitrosoaniline or a clay blend containing the compound by a final wash of the compound or blend with an aqueous-sodium hydroxide solution. The compound can be prepared as described in Example 7 of the Mullin's patent, supra, or as follows: Methanol (137.2 pounds) is charged into a suitable reactor and 88.78 pounds of molten N-(2-methyl-2-nitropropyl)aniline is then added to the reactor. The mixture is agitated and heated to 40° C. to insure a complete solution. Concentrated hydrochloric acid (675.78 pounds) is charged into a suitable, clean, glass-lined reactor equipped with an agitator, thermocouple, feed line, and heating and cooling system. The acid solution is stirred and the methanol solution of N-(2-methyl-2-nitropropyl)aniline is added to the acid. The batch temperature is adjusted to 25° to 30° C. and a sodium nitrite solution is added over a 60 to 90 minute period. Slight cooling is required to maintain the 25°–30° C. temperature during this step. The temperature is adjusted to 30°–35° C. and held there until the reaction is complete as determined by polarographic analysis. Slight heating is required to maintain this temperature. The completed reaction mixture is cooled to 10° C. and quenched by adding an aqueous-acetone solution. The batch temperature should be maintained below 35° C. during this quenching. The quenched batch is neutralized to a pH of 9.5 to 10.5 by the addition of a 25% aqueous-sodium hydroxide solution. The neutralized reaction mixture is stirred and held at a constant pH of 9.5 to 10.5 for a minimum of one hour.

The product is isolated by filtration. The filter cake is washed with a 1% aqueous-sodium hydroxide solution and dried. The addition of sodium hydroxide to the final wash of the product shows a marked improvement in the product's thermal stability. This improvement is illustrated in Table I below which shows results of thermal stability tests on the product in a clay mixture.

The stability tests, below are run on a blend of one-third N-(2-methyl-2-nitropropyl)-4-nitrosoaniline blended with two-thirds Whitex clay. Before the blending step the N-(2-methyl-2-nitropropyl)-4-nitrosoaniline is washed with a 1% aqueous-sodium hydroxide solution and dried. N-(2-methyl-2-nitropropyl)-4-nitrosoaniline and the blend have a tendency to decompose exothermally resulting in self-heating when stored in bulk quantities above ambient temperatures. The ability of a particular sample to self-heat is assessed in an accelerated test by observing the temperature rise of a sample stored at a temperature of about 70° C. The time required for the sample to increase in temperature from 69° to 79° C. is a measure of its thermal stability. The test is carried out in a Dewar flask. The Dewar flask and stopper are heated to 68°–70° C. A 120 gram sample of the blend is placed on a sheet of paper and heated to 68°–70° C. The sample is transferred to the Dewar flask. A thermocouple is placed in the center of the sample and the Dewar flask is immediately transferred to a 70° C. oven. The sample temperature and oven temperature are recorded continuously until the sample temperature exceeds 80° C. When the sample temperature exceeds 80° C. the test is discontinued and the sample is discarded. The results are reported in the table, below, as the time in hours required for the sample to self-heat from 69° to 79° C.

For other data in Table I, N-(2-methyl-2-nitropropyl)-4-nitrosoaniline is used without clay blending. A filtered product is divided into six parts and one part of the wet filter cake is washed with water alone and other parts are washed with various concentrations of aqueous-sodium hydroxide solution. One liter of wash is used with each portion which contains about 50 grams of N-(2-methyl-2-nitropropyl)-4-nitrosoaniline on a dry basis. The products wet with the indicated wash liquid are dried and the assay, total acidity (measured in a non-aqueous system using tetrabutylammonium hydroxide as titrate) and apparent pH determined. The data are recorded in Table I. The dried products are then blended with clay and the stability determined as described.

TABLE I

| | N-(2-methyl-2-nitropropyl)-4-nitrosoaniline | | | Blend of ⅓ N-(2-methyl-2-nitropropyl)-4-nitrosoaniline and ⅔ Whitex clay (hours for 10° temp. rise from 69°–79° C.) |
|---|---|---|---|---|
| | Percent NaOH in wash solution | Assay | Percent total acidity | Apparent pH | |
| 1 | [1] 0 | 94.0 | 3.12 | <4.0 | 3¾ |
| 2 | 0.05 | 92.5 | 3.04 | <4.0 | 5½ |
| 3 | 0.1 | 92.7 | 2.86 | <4.0 | 5½ |
| 4 | 0.4 | 94.9 | 1.82 | 4.2 | 66 |
| 5 | 0.7 | 93.9 | 1.19 | 6.4 | 78 |
| 6 | 1.0 | 92.5 | Trace | 10.85 | 98 |

[1] Water alone.

Compared to the blank wash (1.), the 1% aqueous-sodium hydroxide wash (6.) shows a 94¼ hours improvement in stability. The assays reported in the table illustrate that the washed and dried product is not purified by the wash. The apparent pH and percent total acidity values (measured in a non-aqueous system) indicate the amount of acidity remaining in the washed and dried crystalline product. The percent total acidity is the weight percent calculated as HCl.

The pH range of a 0.1 N aqueous solution of the alkali metal hydroxides and alkaline salts of alkali metals useful in this invention is from 9 to 14, and examples within this range are shown in the Handbook of Chemistry and Physics, page D–73 (45th ed. 1964, 65). The data in Table II illustrate the stabilizing effects of potassium hydroxide and sodium carbonate washes on N-(2-methyl-2-nitropropyl)-4-nitrosoaniline.

TABLE II

| Percent base in wash solution | Blend of ⅓ N-(2-methyl-2-nitropropyl)-4-nitrosoaniline and ⅔ Whitex clay (hours for 10° temp. rise from 69°–79° C.) |
|---|---|
| 0 (water alone) | 7.0 |
| 1% NaOH | 90 |
| 1% Na₂CO₃ | 41.5 |
| 1% NaHCO₃ | 12 |
| 1% NH₄OH | 10 |
| 1% KOH | 61 |

The data in Table II illustrate that sodium bicarbonate and ammonium hydroxide are not effective in the practice of this invention.

The compositions of this invention are nitrosoanilinonitroalkanes containing a stabilizing amount of an alkali metal hydroxide or an alkaline salt of alkali metal. Acid titration of the water extract of a composition of N-(2-methyl-2-nitropropyl)-4-nitrosoaniline which has been washed with a 1% sodium hydroxide solution shows a concentration of 0.46% by weight NaOH present. Acid titration of the water extract of a composition of N-(2-methyl-2-nitropropyl)-4-nitrosoaniline which has been washed with a 1% potassium hydroxide solution shows a 0.34% by weight KOH present. The preferred range for the concentration of base admixed with the nitrosoanilinonitroalkanes is 0.1 to 3.0% by weight.

Nitrosoanilinonitroalkanes improved by the practice of my invention have the general formula

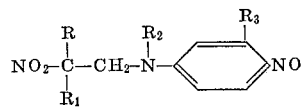

where R is hydrogen, lower alkyl,

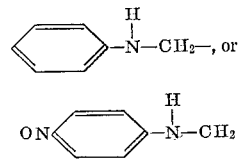

$R_1$ is hydrogen or lower alkyl or taken together R and $R_1$ are alkylene. $R_2$ is hydrogen, lower alkyl or nitroso and $R_3$ is hydrogen, halogen, or alkyl. These nitrosoanilinonitroalkanes are active modifiers and promoters for elastomer-carbon black interaction.

The aqueous wash solutions of this invention can contain from 0.2% to 5% by weight aqueous alkali metal hydroxide or alkaline salt of alkali metal. The preferred range of base is from 0.4% to 1.5%.

Comparable results to those in the tables, supra, are obtained with other aqueous-solutions of alkali metal hydroxides and alkaline salts of alkali metals within this invention.

It is intended to cover all changes and modifications of the examples of the invention herein chosen for purposes of disclosure which do not constitute departures from the spirit and scope of the invention.

I claim:
1. A method of improving the thermal stability of nitrosoanilinonitroalkanes wherein a reaction mixture containing a nitrosoanilinonitroalkane is neutralized with a base and the nitrosoanilinonitroalkane is isolated, the improvement which comprises:
    washing the isolated nitrosoanilinonitroalkane with an aqueous alkali metal hydroxide, and
    drying the product admixed with the aforesaid aqueous alkali metal compound.

2. A method of improving the thermal stability of nitrosoanilinonitroalkanes according to claim 1 wherein the washing element comprises:
    washing the isolated nitrosoanilinonitroalkane with a 0.4% to 1.5% aqueous-sodium hydroxide solution.

3. A method of improving the thermal stability of nitrosoanilinonitroalkanes according to claim 1 wherein the washing element comprises:
    washing the isloated nitrosoanilinonitroalkane with a 0.4% to 1.5% aqueous-potassium hydroxide solution.

4. A method of improving the thermal stability of N-(2-methyl-2-nitropropyl)-4-nitrosoaniline wherein a reaction mixture containing the compound is neutralized with a base and the N-(2-methyl-2-nitroproyl)-4-nitrosoaniline is isolated, the improvement which comprises:
    washing the isolated N-(2-methyl-2-nitropropyl)-4-nitrosoaniline with an aqueous alkali metal hydroxide, and
    drying the product admixed with the aforesaid aqueous alkali metal compound.

5. A method of improving the thermal stability of N-(2-methyl-2-nitropropyl) - 4 - nitrosoaniline according to claim 4 wherein the washing element comprises:
    washing the isolated N-(2-methyl-2-nitropropyl)-4-nitrosoaniline with a 0.4% to 1.5% aqueous-sodium hydroxide solution.

6. A method of improving the thermal stability of N-(2-methyl-2-nitropropyl) - 4 - nitrosoaniline according to claim 4 wherein the washing element comprises:
    washing the isolated N-(2-methyl-2-nitropropyl)-4-nitrosoaniline with a 0.4% to 1.5% aqueous-potassium hydroxide solution.

7. Nitrosoanilinonitroalkane admixed with a small amount, sufficient to improve thermal stability, of alkali metal hydroxide.

8. N-(2-methyl-2-nitropropyl)-4-nitrosoaniline admixed with a small amount, sufficient to improve thermal stability, of alkali metal hydroxide.

9. N-(2-methyl-2-nitropropyl)-4-nitrosoaniline according to claim 8 wherein the alkali metal hydroxide is sodium hydroxide.

10. N-(2-methyl-2-nitropropyl)-4-nitrosoaniline according to claim 8 wherein the alkali metal hydroxide is potassium hydroxide.

References Cited

UNITED STATES PATENTS

| | | | |
|---|---|---|---|
| 664,709 | 12/1900 | Ammelburg | 260—577 |
| 3,151,161 | 9/1964 | Mullins et al. | 260—577 |

CHARLES B. PARKER, Primary Examiner

CHARLES F. WARREN, Assistant Examiner

U.S. Cl. X.R.

260—576, 570.5